Oct. 31, 1933.  E. KEEN  1,932,412

DIRECTIONAL INSTRUMENT

Filed May 31, 1930

INVENTOR.
ELIOT KEEN
BY Moses & Nolte
ATTORNEYS

Patented Oct. 31, 1933

1,932,412

UNITED STATES PATENT OFFICE 1,932,412

DIRECTIONAL INSTRUMENT

Eliot Keen, Jackson Heights, N. Y.

Application May 31, 1930. Serial No. 457,957

6 Claims. (Cl. 33—226)

My invention is particularly applicable to gyroscopic compasses.

An object of the present invention is to produce a gyroscopic compass which is substantially free from errors due to the accelerations met with in practical use.

A further object of this invention is to produce a directional instrument which may be moved at high speed of travel from one latitude to another without losing its direction indicating accuracy and without requiring attention, adjustment or calculations to ascertain true direction. A further object of this invention is to provide a gyroscopic compass in which the rotor is free in every direction about the point of support, this one support having its center in the spin axis of the gyro, above or below the center of gravity of the rotor.

A further object of this invention is to produce a gyro with no restrictions connected with the rotor. Heretofore all gyro compasses have had a rotor usually spinning in the vertical plane and attached to same there have been weights which have applied forces to the gyros. All accelerations in all directions tend to disturb such gyros because they are reducible to forces applied to the ends of the axle of the gyro.

A further object of the invention is to provide a gyroscopic compass, or similar directional instrument, which is useful upon air craft as well as upon boats.

A further object of the invention is to provide a directional instrument of the character described which is simple in construction and cheap to manufacture and has few parts and no auxiliary devices to complicate its operation or get out of order.

In the drawing which illustrates certain preferred forms of the invention:

Figure 1:
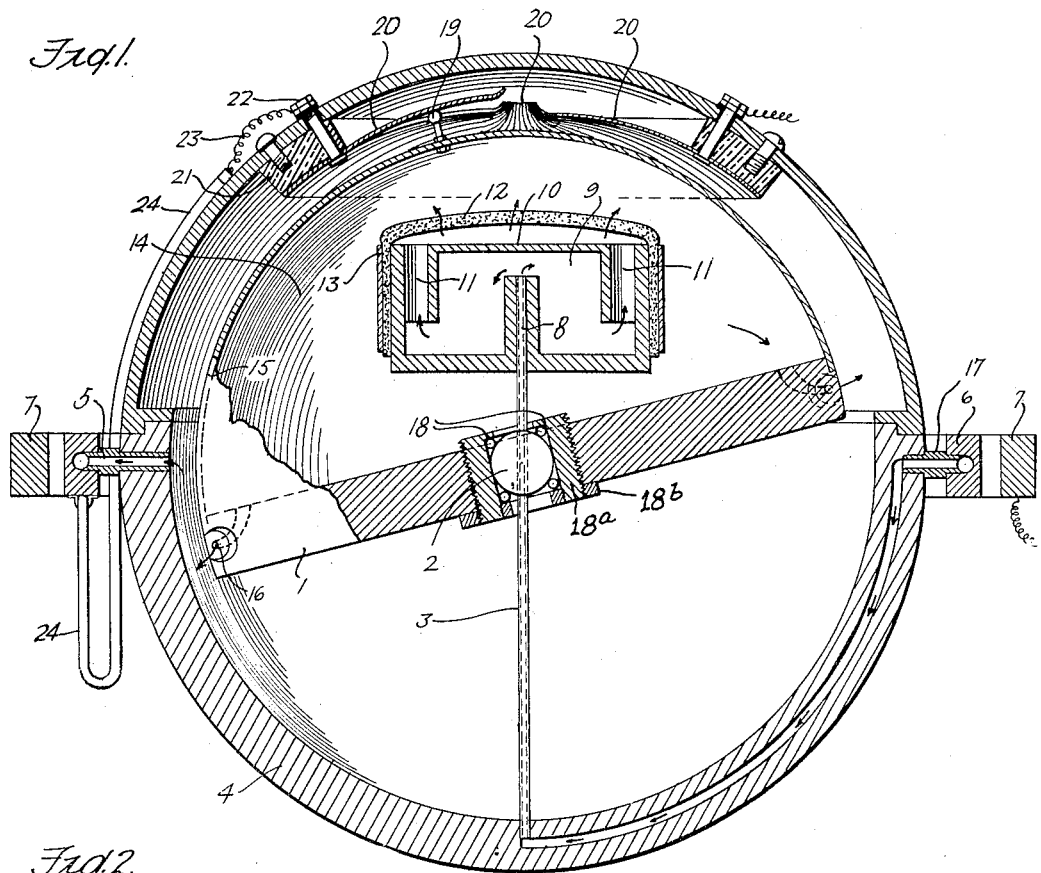
Figure 1 is a vertical cross section of one gyro unit.

Referring to Fig. 1, the gyro comprises a rotating disc 1 which is preferably of substantial weight and which has fixed to it a semicircular shell 15, the two enclosing an air chamber 14. The gyro 1 is mounted to spin upon a ball support 2 preferably by means of ballbearings 18 arranged above and below the ball in such a way as to permit free tipping movement of the gyro in any direction upon the ball, and also to prevent the gyro from being lifted off the ball. The ball bearings 18 are preferably mounted in ball races carried by a sleeve 18a which is adjustably mounted in the gyro 1, preferably by screw threaded engagement therewith, and which may be locked in adjusted position by means of a lock nut 18b. The gyro is preferably adjusted with reference to the ball support so that the center of gravity of the rotating system consisting of the disc 1 and shell 15 is slightly lower than the center of the ball, whereby the gyro will be pendulous and operate in the manner fully described below. The gyro 1 is caused to spin rapidly about the ball 2 by means of air under pressure issuing from the chamber 14 through reaction ports 16 in the periphery of the gyro 1. The ball 2 is mounted on a tube 3 which preferably is carried by gimbal mountings of suitable construction as shown in Figure 1. The tube 3 is rigidly mounted in the bottom of a hollow ball container 4, the lower part of which is weighted and which is hung upon tubular bearings 5 and 17 supported in gimbal ring 6. The gimbal ring 6 is supported by similar tubular bearings (not shown) in a ring 7 which is rigid with relation to the ship or airplane. Air is discharged into the chamber 14, through the passage 8 in the tube 3 preferably through a diffuser comprising a compartment 9 in a casing 10 which is mounted on the upper end of the tube 3. The air from the chamber 9 passes through a series of holes 11 in the casing 10 evenly arranged about the center and then through the porous medium 12 which is held to the casing 10 by ring 13. By introducing the air into the chamber 14 through the diffuser it enters the chamber at very low velocity so that it does not have any directional tendency which might tend to influence the position of the gyro. The semicircular shape of the shell 15 also acts to prevent the entering air affecting the position of the gyro as irrespective of the tip of the latter, the portion of the semicircular wall of the shell over the air diffuser remains at a constant distance from the diffuser. The flow of air through the reaction ports 16 may be produced either by introducing air under superatmospheric pressure through the bearing 17 and tube 3 or by maintaining a subatmospheric pressure in the ball container 4 by exhausting the air therefrom through the bearing 5. The air may be exhausted from the chamber by means of a suitable pump or by connection with the intake manifold of an engine or other source of suction. If desired the same air may be recirculated by using a pump which exhausts air through the bearing 5 and discharges the air through the bearing 17 into the interior of the chamber 14.

The position assumed by the gyro under the influence of the rotational and gravitational forces to be described may be indicated or recorded in any suitable manner. In the construction shown in Figures 1 and 2 this is done by means of electrical contact devices comprising a contact pin 19 mounted on the shell 15 and engaging with one or another of a series of light spring contacts 20 which are mounted close together but out of contact around an insulating ring 21 fixed in the upper part of the hollow ball container 4. These contact springs are arranged in a series all the way around, so that they form practically a part of a spherical surface, although they are not in electrical contact with one another. The pin 19 engages with one or another of these contact springs 20 depending upon the position of the gyro. Each contact spring has a connection pin 22 and from this pin extends a wire 23, the wires preferably being gathered in a cable 24 which runs to the instrument board and by means of proper electrical connections operate devices showing the direction of the ship. For instance, as shown in Figure 2, the various wires may each be arranged in circuit with a lamp 40, 41, so that when the pin 19 (or 33) is in engagement with a contact spring 20 (or 36), the lamp corresponding with such contact spring will be lighted.

The gyro 1 when set in operation will maintain a determinate relation with the earth's axis which will be substantially independent of motions of the ship on which the instrument is mounted, as will be more fully explained below. It will therefore form a directional instrument by reference to which the direction of movement of the ship may be determined. The orientation of the gyro will, however, be influenced by changes in latitude of the ship, as will be explained.

Figure 2:
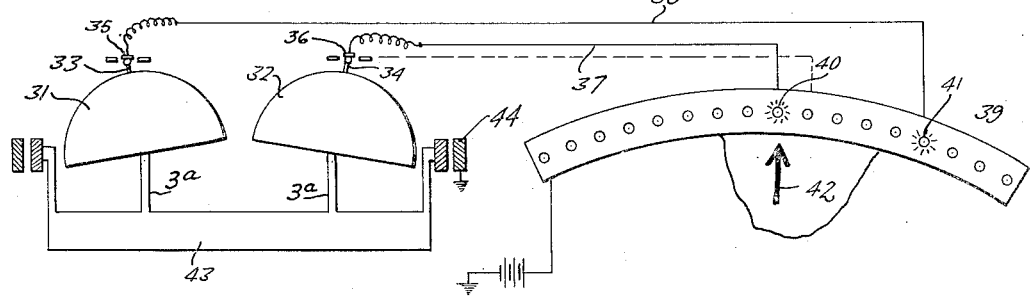
Figure 2 shows in diagram two complementary gyro units and their electric connections.

In order to produce an instrument which will indicate true direction independently of changes in latitude, I have provided the construction shown in Figure 2. As here illustrated, I provide two rotating gyro elements 31 and 32, each of which comprises a rotor disc and a shell similar to the disc 1 and shell 14 as shown in Figure 1, and each of which is mounted to spin on a ball (not shown) carried by a tube 3a. The tubes 3a are mounted in a common base 43 which is carried by gimbal bearings and rings indicated generally at 44 and similarly in construction to the rings and bearings shown in Figure 1. The base 43 is hollow and air under pressure is discharged from it through the tubes 3a to the interior of the two gyros in the manner already set forth in connection with Figure 1. The two gyros 31 and 32 are arranged so that they deviate in opposite senses with changes in latitude of the ship. This may be accomplished either by rotating the gyros in opposite directions or by rotating them in the same direction and arranging the center of gravity of one of the gyros slightly below the center of the ball support, while the center of gravity of the other gyro is raised a corresponding distance above the center of its ball support. By taking a mean reading between the positions of the two gyros a true directional indication is obtained which is independent of latitude. Any suitable means for obtaining this mean indication may be utilized. As illustrated, the two gyros are provided with contact pins 33 and 34 engaging spring contacts 35 and 36, similar in construction to the spring contacts 20 shown in Figure 1, which are connected by wires 37 and 38 to the instrument board 39, so as to energize lamps 40 and 41, a series of such lamps being arranged on the instrument board. The arrow 42 indicates the lubber line of the ship. Whichever pair of lamps are lighted indicate that true west lies half way between them. It will be seen that the indicator now reads that the ship is heading south of west.

Figure 3:
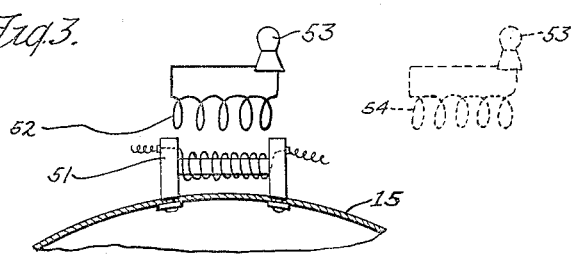
Figure 3 shows an alternative method of reading the position of the gyros.

Figure 3 shows an alternative method of reading the position of the gyro. In this construction in place of using the contact pin 19 physically engaging a contact spring such as 20, means for utilizing an induced current are provided and no physical contact between any member connected with the gyro and a relatively stationary member is necessary. As indicated in this figure the shell 15 carries a small coil which is connected by suitable means to a source of current and by induction sets up a voltage in one of a series of stationary coils, each of which is connected with a suitable lamp such as a neon lamp 53. The stationary coil at the moment adjacent to the movable coil 51 is shown at 52 and another one of the stationary coils 54 is indicated in dotted lines connected with its lamp 53. The lamp 53 connected with the coil 52 which is nearest to the movable coil 51 will be lighted while the other lamps connected with the more remote coils, such as 54, will not be lighted until the position of the ship changes to bring the coil 51 into juxtaposition with another one of the coils 54.

The operation of the compass will be best understood by first taking up the operation of a single gyro unit. The gyro 1 supported by the ball 2 is free to tilt about said ball in all directions within a limited number of degrees as well as to spin on said ball. In the gyro illustrated in Figure 1 the center of gravity of the gyro 1 and shell 15 is slightly below the center of the support 2, i. e. the gyro is pendulous. In order that the cycle of operation may be understood let us assume the gyro is spinning clockwise when viewed from above, that it is at the earth's equator and that it is in the plane of the horizon, i. e. with its spin axis perpendicular to the plane of the horizon. The rotation of the earth tips the plane of the earth's horizon in space continuously down on the east side. As there is no precessional force or gravity couple impressed upon the gyro so long as the center of gravity is in the line between the center of support and the center of the earth the gyro is simply spinning in space. The rotation of the earth however causes the horizon to recede from the east side of the gyro. In other words, viewing the plane of the gyro's horizon from the south pole or a point in space beyond the south pole but in a line with the earth's axis, we would see the plane of the horizon around the gyro revolve around the earth's axis. As the gyro was assumed to have no forces precessing it at the beginning of our description we see then that it would be stationary in space except for its rotation about its own axis, and that its east side would rise as regards the eastern horizon surrounding it.

When the gyro rises on the east with the relation to the horizon it moves the center of gravity of the gyro to the east of the line between the center of support of the gyro and the center of the earth. This is an unstable condition and gravity acts upon the center of gravity of the gyro tending to lower the east side of the gyro by rotating the same about a north and south axis passing through the center of the ball support. As the gyro is spinning clockwise as viewed from above the gyro from a point in the line through the center of support to the center of the earth, the aforesaid action of gravity upon the center of gravity will cause a precession about the east-west axis through the center of support. This precession moves the center of gravity to the north side of the line between the center of support and the center of the earth. When the center of gravity of the gyro reaches the meridian the action of gravity on the center of gravity now at the north of the line between the center of the support and the center of the earth will cause a precession of the gyro on the north-south axis, and the east side will fall or tend to approach the eastern horizon and the west side will rise. If we return to our viewpoint out in space south of south pole we will see that this last tipping of the gyro exactly coincides with the tipping of the horizon due to the rotation of the earth, and therefore the center of gravity of the gyro will remain at a point exactly north of the center of support. The gyro remains tipped up on the north side. It is therefore a directional instrument.

It does not alter the operation if the speed of rotation of the gyro is changed. The gyro in order to tip down on the east side, as the horizon constantly tips down must receive a force on its northern side, and as in this construction the only force reaching the gyro is the force of gravity, and as it will be seen that this force of gravity may not precess the gyro unless the center of gravity is out of the line between the center of the support of the gyro and the center of the earth, therefore at whatever speed the gyro is spinning, it will always have to tip so that its center of gravity will cause a precession about the north-south axis. If the gyro is spinning clockwise when viewed from above, the center of gravity must be north of the center of support. If the gyro is spinning counter clockwise when viewed from above, it will tip up on the south side, bringing the center of gravity of the gyro south of the line between the center of support of the gyro and the center of the earth, thus causing a precession on the north-south axis which will throw the east side of the gyro down.

When the gyro is in north latitude the center of gravity will find a position of equilibrium east of the meridian provided the gyro is spinning clockwise when viewed from above. The reason for this position will be explained later.

It was previously explained that at whatever speed the gyro is spinning it is a directional instrument; tipping north or south of the plane of the horizon, according to its direction of spin. The amount of this tip is dependent upon the speed of the gyro but the relative direction of the tip depends only on direction of rotation, not on speed. If the gyro is heavily pendulous and the speed is slow, the angle will be very small, although it must be there, but if the speed is very high, and the gyro is very slightly pendulous, that is if the theoretical center of gravity is only slightly below the actual center of the ball support, then the tip will be greater.

The air reaction ports 16 are arranged so that the rotational thrust or torque of the escaping air is in the plane of the frictional resistance to rotation, which in the construction shown is in effect the plane of rotation of the gyro, so that the friction has no positioning or precessional effect, and the torque has no precessional or positioning effect.

Having thus described the action of the gyro at the equator, we will consider the same gyro at a point removed from the equator, for instance at 40 degrees north latitude.

At the equator the spin axis coincides with the meridian and the gyro falls exactly on the east side. As the gyro moves into north latitude, the horizontal component of north changes the motion so that it is no longer only east but now is east plus the north turning motion, which is well known. Therefore in north latitude the spin axis moves to a new position and is no longer on the meridian, to compensate for this horizontal component.

In explanation of this phenomenon I would again point out that the force which produces precession is the out of balance weight and the gravity couple and that the gravity couple is only exerted on said out of balance weight when the center of gravity is out of the line between the center of the ball support and the center of the earth, i. e. when the tip of the gyro swings the center of gravity of the gyro to one side, precession begins. Therefore the more the tip the more force is applied to precess the gyro because the weight is farther out of line with the center of the ball support. In consequence the precession is slower when there is only a slight tip than it is when the tip is greater.

As the horizontal component of the motion of the earth's surface away from the equator increases and the travel to the east comes nearer to the plane of spin of the gyro, the angle of the gyro grows less and the speed of precession grows less. The earth rotation at whatever parallel of latitude is 360° daily, therefore the gyro axis of precession, which lies in the plane through the high side of the gyro, through the center of gravity and through the center of support and the low side, swings toward the east and the earth receding from it increases the tip and increases the precessional force which again moves the center of gravity toward the meridian. Thus a condition of equilibrium is reached for each latitude.

However, it is possible by my construction of gyros to use a second gyro which will place its spin axis away from the meridian in similar fashion to the first gyro but in an opposite direction.

By taking the mean between the positions assumed by these gyros it is possible to obtain the true direction unaffected by changes in latitude.

In the practical operation of this instrument acceleration forces do not introduce appreciable errors.

Furthermore the small amount of out of balanced weight which is required to produce the precession which will offset the earth's rotation establishes a period of precession so much greater than any period which would be produced by the temporary accelerations met with in practice, that the errors produced by such accelerations are negligible.

In the means selected for illustration as the preferred form of my invention, I have shown those believed by me to be best adapted for attaining the stated objects of my invention, but such means are themselves susceptible of a wide range of modification without departure from the spirit of my disclosure.

I believe my invention as described to be broadly novel both as to methods involved and the range of possible physical embodiments thereof. Since the physical means of practice of my invention are capable of expression in a great variety of structural forms, I do not intend to be understood as limiting the scope of my disclosure by any particular description thereof contained in the specification.

I claim:

1. In an instrument of the character described, a ball support having a passage therethrough, a rotating gyro element mounted to have spinning and free tilting movement on said ball support, said rotating element being provided with fluid reaction ports, and means for introducing fluid under pressure through said ball support and discharging it through said reaction ports for rotating said rotating member, the spin axis of said rotating member when operating being more nearly vertical than horizontal.

2. In an instrument of the character described, a support having a passage therethrough and an external spherical supporting surface, a rotating gyro element mounted for spinning and free tilting movement on said spherical surface, a shell mounted on said rotating element and having an inner surface forming a part of the surface of a sphere, the center of which coincides with the center of the spherical supporting surface, there being reaction ports in said rotating element communicating with the chamber enclosed by said shell and rotating element, and means for causing fluid under pressure to flow through the opening in said support into said chamber and be discharged through said reaction ports so as to rotate said rotating element.

3. In an instrument of the character described, a support having a passage therethrough and an external spherical supporting surface, a rotating gyro element mounted for spinning and free tilting movement on said spherical surface, a shell mounted on said rotating element and having an inner surface forming a part of the surface of a sphere, the center of which coincides with the center of the spherical supporting surface, there being reaction ports in said rotating element communicating with the chamber enclosed by said shell and rotating element means for causing fluid under pressure to flow through the opening in said support into said chamber and be discharged through said reaction ports so as to rotate said rotating element, and means in said chamber for diffusing the fluid pressure entering the chamber so as to reduce the velocity of the entering fluid.

4. In a directional instrument for indicating true direction irrespective of changes in latitude, two gyroscopes of the character claimed in claim 1 arranged to act in opposite senses, and means for reading the mean between the directions indicated by the two gyros.

5. In an instrument of the character described, a gyro system including a rotating gyro element, the spin axis of which, when operating, is more nearly vertical than horizontal, means for rotating said element and supporting means for said element which permit freedom of precession of said element around any of the axes intersecting said spin axis at a common point thereon, and at right angles thereto, the center of gravity of the gyro system, comprising said rotating element and any parts associated therewith so as to be precessed thereby, lying in said spin axis, the means for rotating said gyro element comprising an enlarged fluid pressure chamber formed therein, there being reaction ports in said element communicating with said fluid pressure chamber and means for introducing a gaseous fluid under pressure into said chamber at the central support of said rotating element.

6. In an instrument of the character described, a support having a passage therethrough and an external spherical supporting surface, a rotating gyro element mounted for spinning and free tilting movement on said spherical surface, said rotating gyro element having spaced ballbearings therein engaging said spherical surface above and below the center thereof, said element being formed to provide an enlarged fluid pressure reservoir therein, there being reaction ports in said rotating element communicating with said reservoir, and means for causing gaseous fluid under pressure to flow through the passage in said support into said reservoir and be discharged from said reservoir through said reaction ports so as to rotate said rotating element.

ELIOT KEEN.